(12) United States Patent
Hollinger et al.

(10) Patent No.: US 11,943,881 B2
(45) Date of Patent: Mar. 26, 2024

(54) ARC FLASH ENERGY DIFFUSER

(71) Applicant: Schneider Electric USA, Inc., Andover, MA (US)

(72) Inventors: Daniel Hollinger, Cedar Rapids, IA (US); Alan Schmidt, Marion, IA (US)

(73) Assignee: Schneider Electric USA, Inc., Boston, MA (US)

( * ) Notice: Subject to any disclaimer, the term of this patent is extended or adjusted under 35 U.S.C. 154(b) by 734 days.

(21) Appl. No.: 17/073,275

(22) Filed: Oct. 16, 2020

(65) Prior Publication Data
US 2022/0124918 A1    Apr. 21, 2022

(51) Int. Cl.
| H05K 5/02 | (2006.01) |
| B01D 39/10 | (2006.01) |
| B01D 46/12 | (2022.01) |
| B01D 46/50 | (2006.01) |
| B01D 46/62 | (2022.01) |

(52) U.S. Cl.
CPC .......... *H05K 5/0213* (2013.01); *B01D 39/10* (2013.01); *B01D 46/12* (2013.01); *B01D 46/50* (2013.01); *B01D 46/62* (2022.01); *B01D 2267/40* (2013.01); *B01D 2267/60* (2013.01); *B01D 2279/45* (2013.01)

(58) Field of Classification Search
CPC ........ B01D 46/62; B01D 46/12; B01D 46/50; B01D 2267/40; B01D 2267/60; B01D 2279/45; B01D 2239/1208; B01B 39/10; B01B 39/12; H05K 5/0213; H02B 11/02; H02B 1/565; H01H 9/342
USPC .......... 218/157, 156, 34, 35, 51, 52, 98, 106
See application file for complete search history.

(56) References Cited

U.S. PATENT DOCUMENTS

| 8,576,082 | B2 | 11/2013 | Jones | |
| 9,478,951 | B2* | 10/2016 | Faber | H02B 13/025 |
| 10,020,144 | B2* | 7/2018 | Rival | H01H 73/18 |
| 10,347,438 | B2* | 7/2019 | Pavageau | H01H 9/362 |
| 10,375,843 | B2* | 8/2019 | Boily | H01H 9/342 |
| 2014/0166623 | A1* | 6/2014 | Page | H01H 33/53 218/157 |
| 2017/0063052 | A1* | 3/2017 | Johnson | H02B 13/025 |
| 2017/0098924 | A1* | 4/2017 | Trussler | H02B 13/025 |
| 2019/0022568 | A1* | 1/2019 | Chernansky | B01D 46/0093 |

* cited by examiner

*Primary Examiner* — William A Bolton
(74) *Attorney, Agent, or Firm* — Locke Lord LLP

(57) ABSTRACT

An arc flash management system including a cabinet having multiple walls surrounding electrical equipment capable of producing arc flash, at least one aperture within one of the walls, and an arc exhaust attachment emanating from at least one of the apertures for directing possible arc flash away from the cabinet.

20 Claims, 5 Drawing Sheets

ARC FLASH ENERGY DIFFUSER

BACKGROUND

Technological Field

The present disclosure is related to a method and system for improving arc flash management and mitigation.

Description of Related Art

An arc flash is produced as part of an arc fault, a type of electrical explosion or discharge that results from a low-impedance connection through air to ground or another voltage phase in an electrical system. These events can be hazardous and dangerous to personnel servicing the systems. A variety of devices are known for preventing arc flashes, such as venting the cabinets or preventing arc flashes from escaping from the electrical boxes. However, when these systems fail the results are often more violent and dangerous.

There is still a need in the art for a component having improved arc flash diffusion and control. The present disclosure may provide a solution for at least one of these remaining challenges.

SUMMARY OF THE INVENTION

An arc flash management system includes a cabinet surrounding electrical equipment capable of producing arc flash, at least one aperture within a wall of the cabinet, and an exhaust attachment emanating from at least one of the apertures for directing a possible arc flash away from the cabinet. At least one filter can be housed within the exhaust attachment to prevent pollutants from entering the cabinet and configured to diffuse possible arc flashes. The filter can include a series of filters of a metal material, wherein each of the filters of the plurality of filters are coupled to each other by a sleeve. The filters of the plurality of filters can progress from more coarse to more fine from the aperture to an outlet of the exhaust attachment.

The arc exhaust attachment can be threadably coupled to the cabinet. The arc exhaust attachment can include a first portion directed in a first direction, and a second portion directed in a second direction. A cap inserted into the exhaust attachment can be used to prevent pollutants from entering the cabinet and indicate if an arc flash even had occurred. The cap can include a first rim at a first end of the cap, and a second rim at a second end of the cap, wherein the rim includes at least one gap therein. The arc exhaust attachment can include a first end within the cabinet, and a second end outside of the cabinet, wherein the second end is open. At least one of the walls can include a removable portion for producing a second aperture, wherein the second aperture is configured to receive a second arc exhaust attachment when the removable portion is removed.

A method of controlling an arc flash is also disclosed. The method includes installing an arc exhaust attachment within an aperture of a cabinet surrounding electrical equipment capable of producing an arc flash, operating the electrical equipment in a way that produces an arc flash, and dissipating energy stored in the arc flash by a filter housed within the arc exhaust attachment, comprising moving a cap from a first position to a second position by the arc flash. The cap can be fully within the exhaust attachment at the first position and partially within the exhaust attachment at the second position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
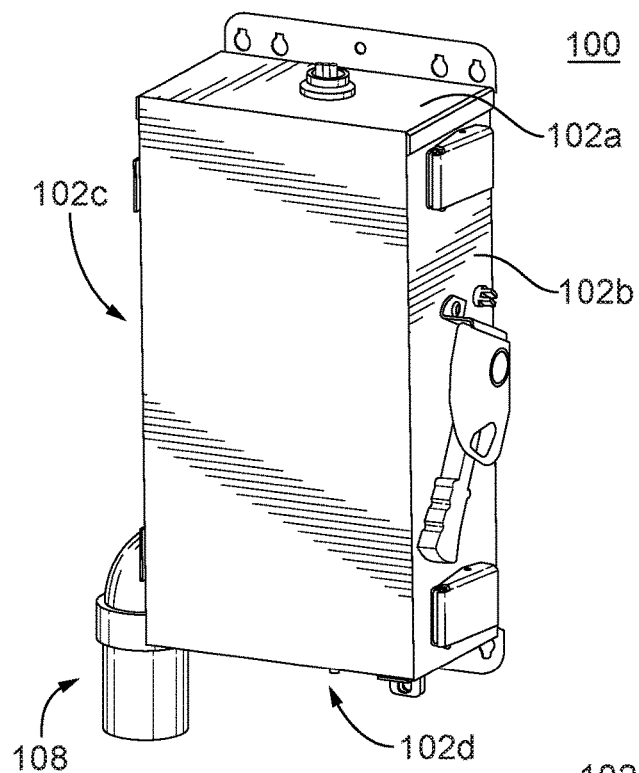
FIG. 1 is a perspective view of an electrical cabinet.

Reference will now be made to the drawings wherein like reference numerals identify similar structural features or aspects of the subject invention. For purposes of explanation and illustration, and not limitation, a partial view of an exemplary embodiment of an arc flash management system in accordance with the invention is shown in FIG. 1 and is designated generally by reference character 100. Other embodiments of the system in accordance with the invention, or aspects thereof, are provided in FIGS. 2-7, as will be described. The methods and systems of the invention can be used to direct and pacify an arc flash produced within an electrical box.

Figure 2:
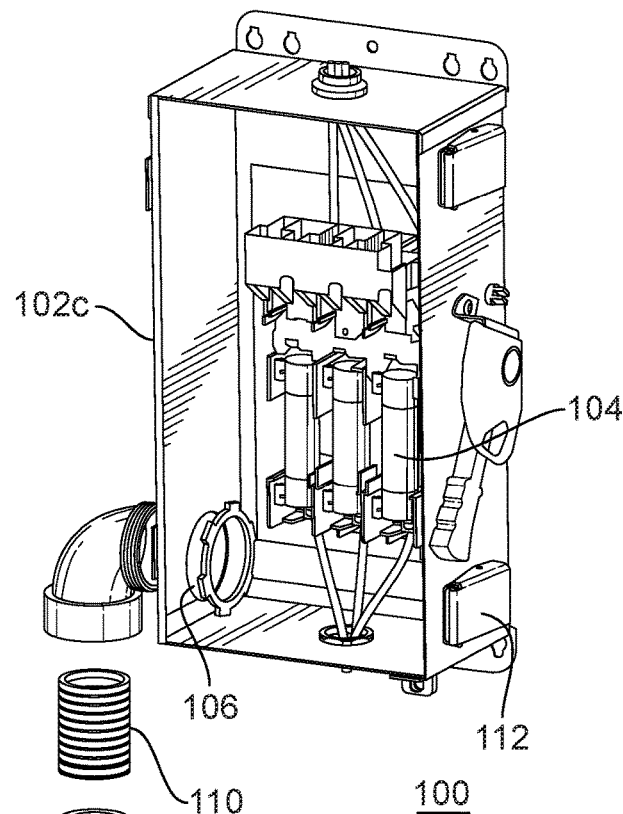
FIG. 2 is a perspective view of FIG. 1, showing an inside of the electrical cabinet and the filters within the arc exhaust attachment.

FIGS. 1 and 2 show an arc flash management system including a cabinet 100 having multiple walls 102a-d. The cabinet 100 houses electrical equipment 104 (shown in FIG. 2), such as switches and cabling. During operation the equipment 104 might produce arc flash due to a build-up of gasses and current. One of the cabinet walls 102c includes at least one aperture 106 and an arc exhaust attachment 108 threadably coupled to the wall 102c for directing possible arc flash away from the cabinet 100. The arc exhaust attachment 108 allows arc energy to be directed away from the door and seams of the cabinet and away from an operator or passerby standing in front of the cabinet 100. A threadable connection allows the arc exhaust attachment 108 to be removed and replaced as well as being customized for each location and application, but other methods of coupling and uncoupling of the arc exhaust attachment 108 to the wall 102a are also conceived.

Figure 3:
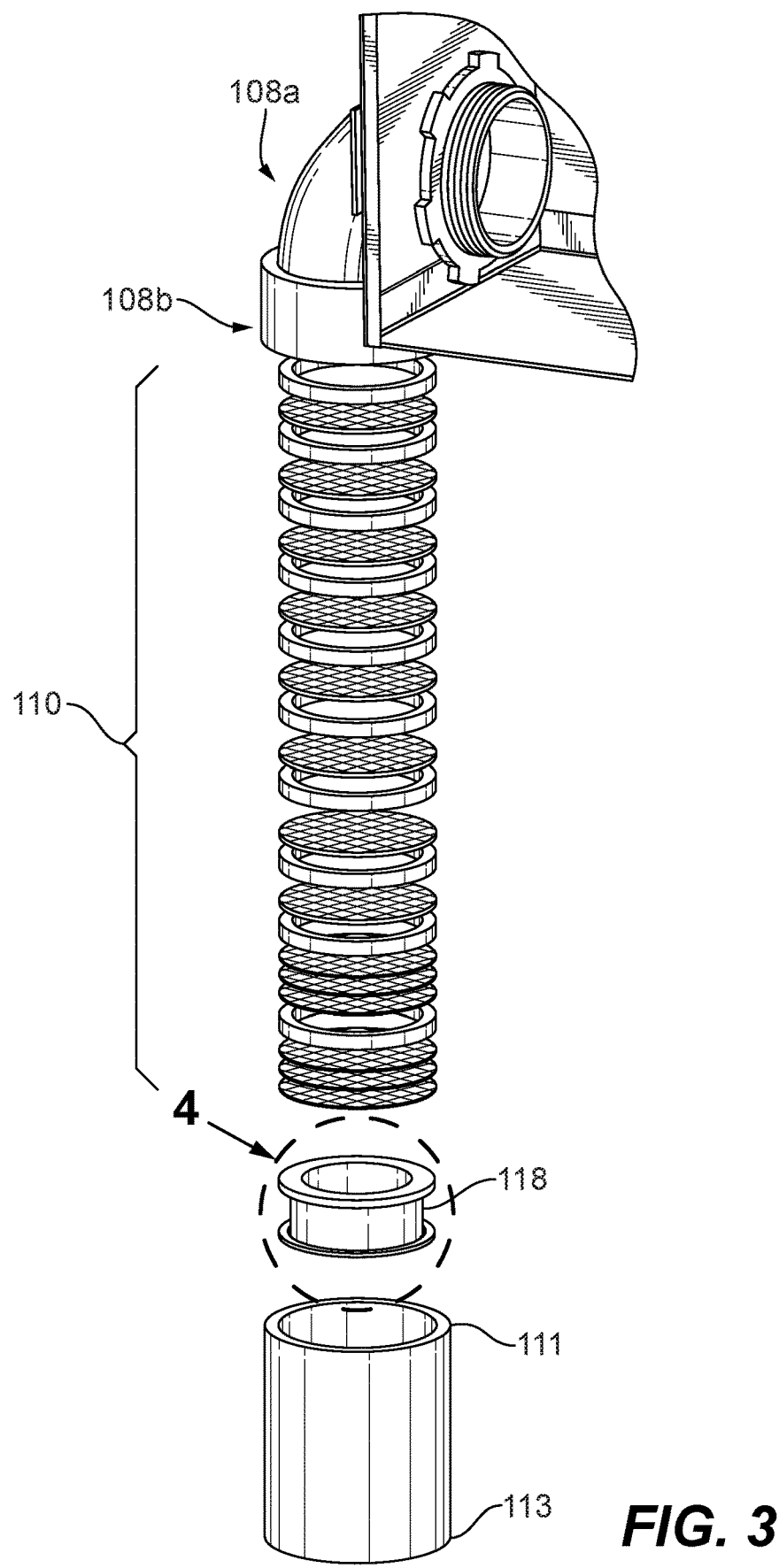
FIG. 3 is an exploded view of the filters and cap.
Figure 4:
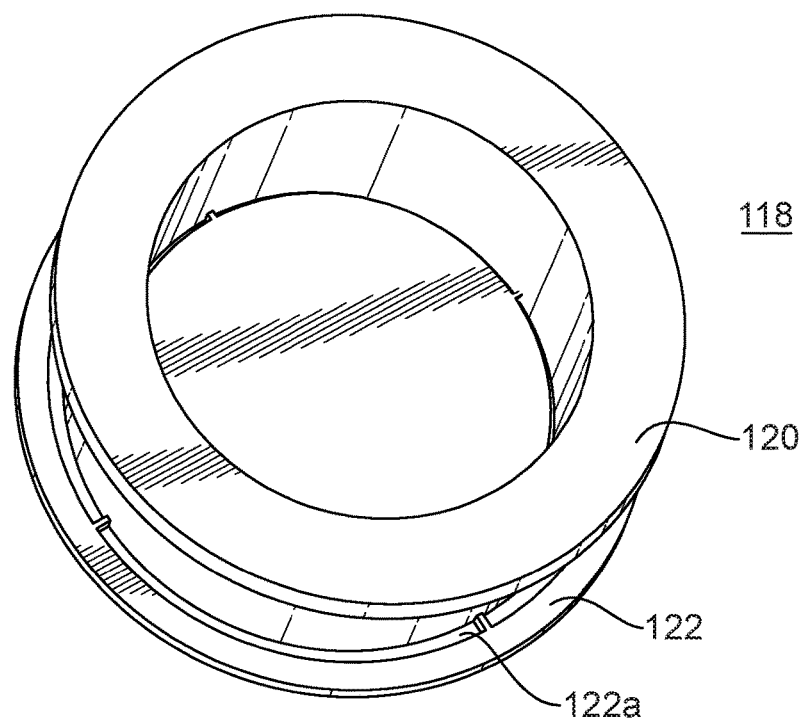
FIGS. 4 and 5 are perspective views of the cap.
Figure 5:
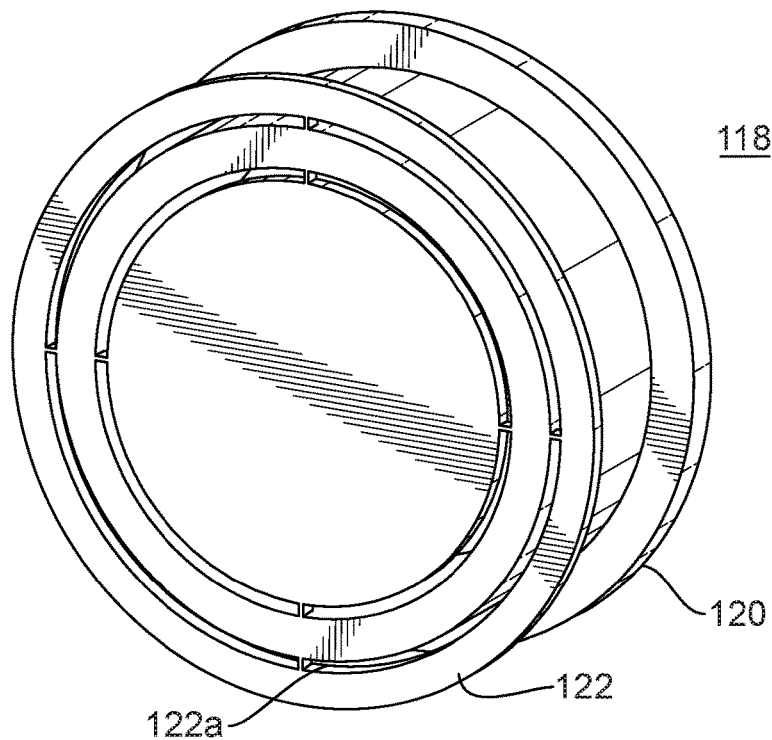

FIG. 3 shows a detailed view of the arc exhaust attachment 108. The arc exhaust attachment 108 includes a first portion 108a directed in a first direction away from the cabinet 100, and a second portion 108b curving in a second direction which points gravitationally down. This arrangement further helps ensure that arc flashes are directed away from operators or passerbys standing outside of the cabinet 100. It is also conceived that the arc exhaust attachment 108 includes a metallic material and has a melting point above arc flash temperature. FIGS. 2 and 3 further show a series of metal or plastic filters 110 housed within the arc exhaust attachment 108. The series of filters 110 prevent pollutants from entering the cabinet 100 and also diffuse and cool arc flashes directed through the arc exhaust attachment 108. The filters 110 can be pressure fit within the arc exhaust attachment 108, it is also considered that a first end of the attachment 111 can have a larger diameter than a second end 113, allowing the filters 110 to slide into the arc exhaust attachment 108 by the first end 111 for easy installation. The ends 111 and 113 also prevent the filters from sliding out of the arc exhaust attachment 108. It is also conceived that each of the filters 110 can be threaded into the arc exhaust attachment 108. Each of the filters 110 can also be pressed into a sleeve 116 (shown in FIG. 6) coupling each of the filters together, and maintaining a distance between each of the filters 110. The sleeve 116 can then be pressed or otherwise installed into the arc exhaust attachment 108.

The filters 110 can be installed, inspected, and changed-out individually or as a group if any are damaged by the arc flash. The filters 110 can include a combination of various porosities, combinations of metal mesh and metal screens which restrict and re-direct airflow to cool arc gasses. The filters 110 can be positioned such that adjacent filters direct gasses at opposing angles in order to further diffuse heat and gasses.

Figure 7:
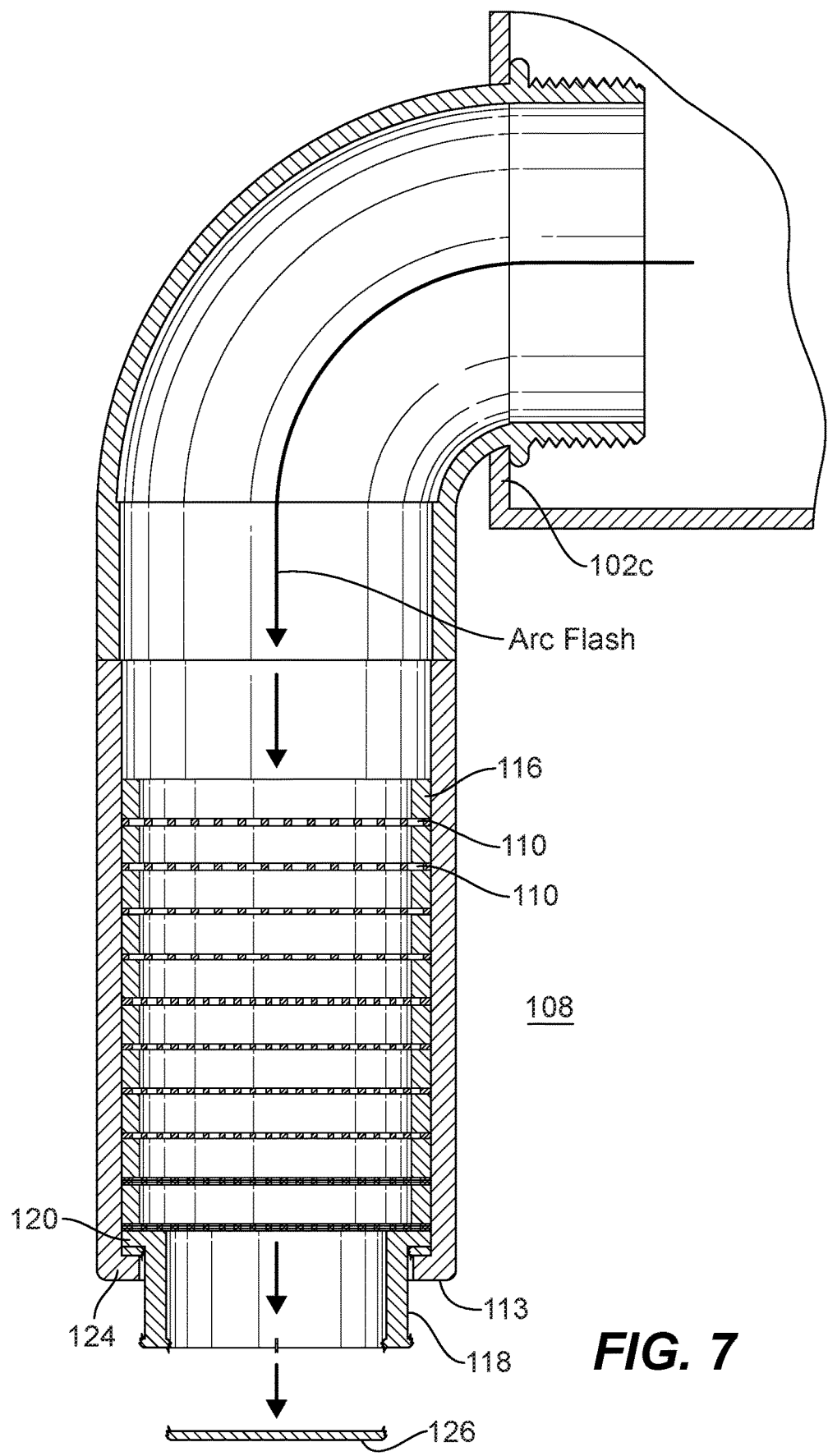
FIG. 7 is a side view of an assembled exhaust attachment with the cap in a second position.

FIGS. 2-5 further shows a cap 118. The cap 118 is installed within the arc exhaust attachment 108. When the cap 118 is initially installed, it is pressed in, such that no portion of the cap is visible to a user. When an arc flash occurs the cap 118 is partially forced out (as shown in FIG. 7) signifying to users that the event occurred. The cap 118 further protects the arc flash gasses from escaping the arc exhaust attachment 108, prevents moisture build up within the cabinet 100, and also prevents dust particles from getting inside. The cap 118 can be cylindrical with two rims. The upper rim 120 prevents the cap 118 from sliding all the way out of the arc exhaust attachment 108, while the lower rim 122, having at least one gap 122a within the rim 122, is configured to break and allow cap 118 to slide partially out of the arc exhaust attachment 108 during an arc flash event.

Figure 6:
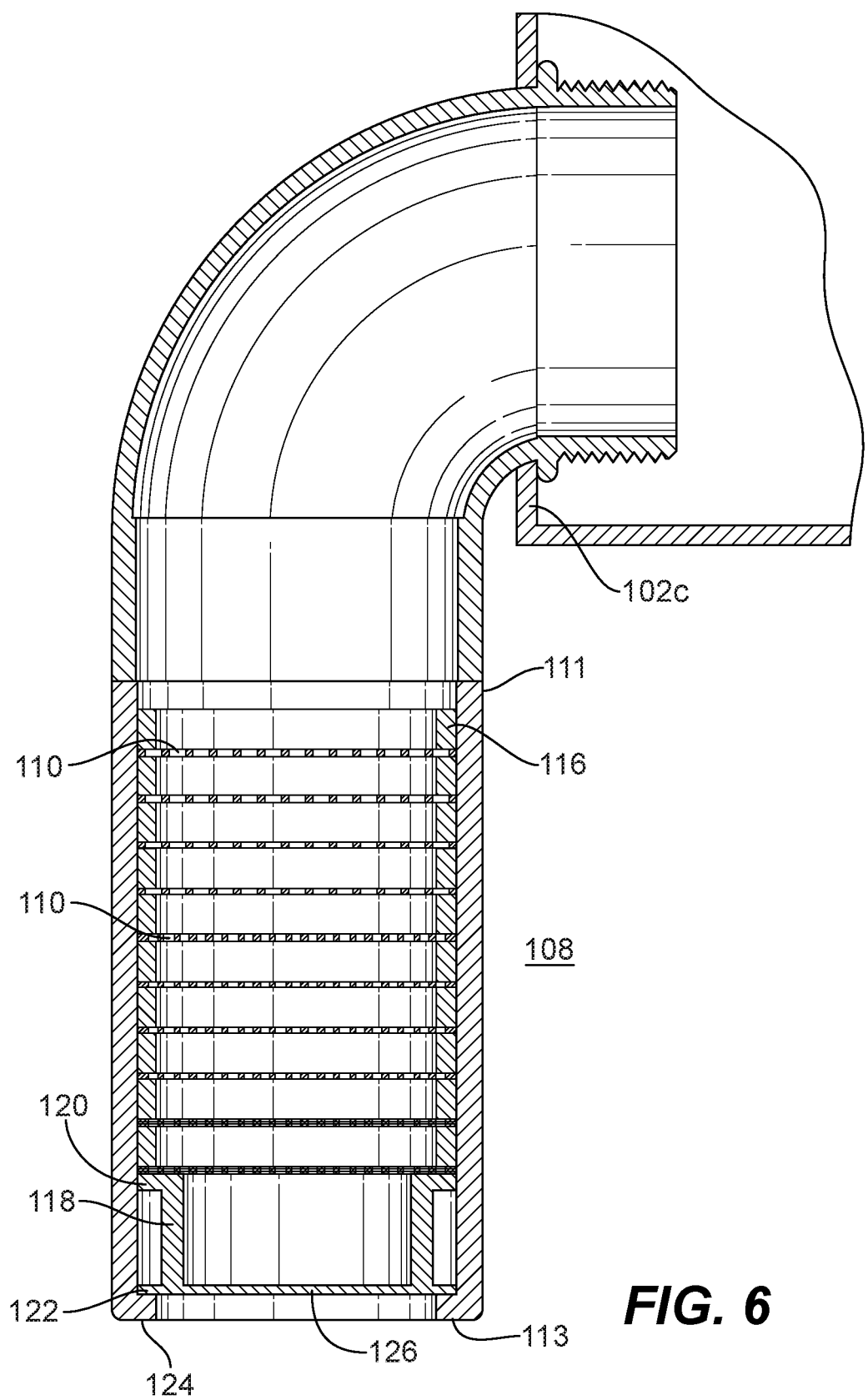
FIG. 6 is a side view of an assembled exhaust attachment with the cap in a first position.

FIGS. 6 and 7 demonstrate what happens within the arc exhaust attachment 108 during an arc flash event. FIG. 6 shows the state of the arc exhaust attachment 108 before the event. Cap 118 is held in place by rim 122 and by a lip 124 of the second end 113 of the arc exhaust attachment 108. As an arc flash even occurs (indicated by bold arrows in FIG. 7) the energy presses through the filters 110, and forces cap 118 through the second end 113. The lip 124 engages the rim 122 breaking it, but stopping at rim 120. A top of cap 126 can also be forced out further absorbing a portion of the arc flash energy.

It is also considered that at least one of the walls 102a-d of the cabinet can include a removable portion 112 that, when removed, produces a second aperture to receive a second conduit (not shown). This allows cabinets to be retrofitted with the aforementioned arc exhaust attachment 108 and filter 110 system as described above and which would allow for twice as much space from which to discharge the arc flashes.

The methods and systems of the present disclosure, as described above and shown in the drawings, provide for an electrical cabinet with superior properties including increased reliability and stability, and arc flash control. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An arc flash management system, comprising:
   a cabinet having multiple walls, the cabinet surrounding electrical equipment capable of producing an arc flash, wherein at least one wall of the cabinet comprises at least one aperture;
   an arc exhaust attachment emanating from the at least one aperture, the arc exhaust attachment configured to direct the arc flash, when produced, away from the cabinet; and
   a cap installed in the arc exhaust attachment, the cap configured to prevent pollutants from entering the cabinet and to indicate if the arc flash has occurred.

2. The system of claim 1, further comprising at least one filter housed within the arc exhaust attachment, the at least one filter configured to prevent pollutants from entering the cabinet and to diffuse arc flashes.

3. The system of claim 2, wherein the at least one filter comprises a plurality of filters in series.

4. The system of claim 2, wherein the at least one filter includes a metal material.

5. The system of claim 3, wherein each filter of the plurality of filters is coupled to another filter of the plurality of filters by a sleeve.

6. The system of claim 3, wherein the plurality of filters progress from more coarse to more fine in a direction from the aperture to an outlet of the arc exhaust attachment.

7. The system of claim 1, wherein the arc exhaust attachment is threadably coupled to the cabinet.

8. The system of claim 1, wherein the arc exhaust attachment includes a first portion directed in a first direction, and a second portion directed in a second direction.

9. The system of claim 1, wherein the cap includes a first rim at a first end of the cap, and a second rim at a second end of the cap, wherein the second rim includes at least one gap therein and is configured to break and allow the cap to slide partially out of the arc exhaust attachment during an arc flash event.

10. The system of claim 1, wherein the arc exhaust attachment includes a first end within the cabinet, and a second end outside of the cabinet, wherein the second end is open.

11. The system of claim 1, wherein at least one of the walls of the cabinet includes a removable portion for producing a second aperture.

12. The system of claim 11, wherein the second aperture is configured to receive a second arc exhaust attachment when the removable portion is removed.

13. The system of claim 1, wherein the aperture is formed in a side wall of the cabinet.

14. An apparatus for directing an arc flash comprising:
   an arc exhaust attachment including a threadable coupling for coupling the arc exhaust attachment to an electrical cabinet;
   a plurality of filters located within the arc exhaust attachment, the plurality of filters configured to prevent pollutants from entering the electrical cabinet and to diffuse arc flashes emanating from the electrical cabinet; and
   a cap installed in the arc exhaust attachment, the cap configured to prevent pollutants from entering the cabinet and to indicate if the arc flash has occurred,
   wherein the plurality of filters include a metal material, and
   wherein the arc exhaust attachment includes a first portion directed in a first direction, and a second portion directed in a second direction, wherein the first direction is perpendicular to the second direction.

15. A method of controlling an arc flash comprising:
installing an arc exhaust attachment within an aperture of a cabinet surrounding electrical equipment capable of producing the arc flash;
operating the electrical equipment in a way that produces the arc flash;
dissipating energy stored in the arc flash by a filter housed within the arc exhaust attachment; and
moving, by the arc flash, a cap installed in the arc exhaust attachment from a first position to a second position to indicate if the arc flash has occurred.

16. The method of claim 15, wherein the cap is fully within the arc exhaust attachment at the first position and partially within the arc exhaust attachment at the second position.

17. The method of claim 16, further comprising removing a portion of the cabinet to produce the aperture.

18. The method of claim 17, wherein the portion to be removed is a knock-out part.

19. An arc flash management system, comprising:
a cabinet having multiple walls, the cabinet surrounding electrical equipment capable of producing an arc flash, wherein at least one wall of the cabinet comprises at least one aperture;
an arc exhaust attachment emanating from the at least one aperture for directing the arc flash, when produced, away from the cabinet; and
a plurality of filters arranged in series and housed within the arc exhaust attachment, the plurality of filters configured to prevent pollutants from entering the cabinet and to diffuse arc flashes,
wherein the plurality of filters progress from more coarse to more fine in a direction from the aperture to an outlet of the arc exhaust attachment.

20. An arc flash management system, comprising:
a cabinet having multiple walls, the cabinet surrounding electrical equipment capable of producing an arc flash, wherein at least one wall of the cabinet comprises at least one aperture; and
an arc exhaust attachment emanating from the at least one aperture for directing the arc flash, when produced, away from the cabinet,
wherein the arc exhaust attachment includes a first end within the cabinet, and a second end outside of the cabinet, and wherein the second end is open.

* * * * *